United States Patent [19]

Furumura et al.

[11] Patent Number: 4,871,268
[45] Date of Patent: Oct. 3, 1989

[54] ROLLING BEARING

[75] Inventors: Kyozaburo Furumura, Kanagawa; Tomoki Muraoka, Fujisawa; Yasuo Murakami, Yamato; Tsutomu Abe, Fujisawa, all of Japan

[73] Assignee: Nippon Seiko Kabushiki Kaisha, Tokyo, Japan

[21] Appl. No.: 143,389

[22] Filed: Jan. 13, 1988

[30] Foreign Application Priority Data

Jan. 17, 1987 [JP] Japan .................. 62-007451
Dec. 10, 1987 [JP] Japan .................. 62-310833

[51] Int. Cl.$^4$ .............................................. C21D 9/36
[52] U.S. Cl. .................................. 384/492; 148/319; 148/906; 428/408; 384/912
[58] Field of Search ............. 384/492, 548, 912, 625; 428/408; 148/319, 318, 906, 16.5

[56] References Cited

U.S. PATENT DOCUMENTS

| 2,194,178 | 3/1940 | Becket et al. ................ 148/319 |
| 3,275,389 | 9/1966 | Neilson et al. ................ 308/8.2 |
| 3,713,905 | 1/1973 | Phillip et al. ................ 148/319 |
| 4,023,988 | 5/1977 | Stickels et al. ................ 148/12.4 |
| 4,191,599 | 3/1980 | Stickels et al. ................ 148/16.5 |
| 4,659,241 | 4/1987 | Bamberger et al. ................ 148/16.5 |

FOREIGN PATENT DOCUMENTS 501339 1/1975 Japan .................. 148/319
857308 12/1960 United Kingdom .

Primary Examiner—Deborah Yee
Attorney, Agent, or Firm—Shapiro and Shapiro

[57] ABSTRACT

A rolling bearing has an inner race, an outer race and a roller, at least one of the inner race, outer race and roller being made with an alloy steel consisting of two or more of 0.2 to 1.7% by weight of Mn, 0.2 to 1.2% by weight of Si, 0.2 to 1.7% by weight of Cr, 0.1 to 0.3% by weight of Mo and 0.1 to 1.0% by weight of Ni, 0.4 to 0.7% by weight of C and the balance of Fe, and by subjecting the alloy steel to carburizing hardening to obtain (a) an additional carbon content at the surface portion of 0.35 to 0.6% by weight and
(b) a dissolved carbon content at the surface portion of 0.75 to 1.1% by weight, and having:
(c) a hardness at the core portion as $H_RC$ of 57 to 64 and
(d) a difference in hardness between the surface portion and the core portion within ±5 of $H_RC$.

12 Claims, 8 Drawing Sheets

ROLLING BEARING

BACKGROUND OF THE INVENTION

1. Field of the Invention

This invention relates to a rolling bearing to be used in the fields of automobiles, construction machines, agricultural machines, electrical equipment, etc., and particularly to a rolling bearing of which the inner race, outer race and/or rolling members have long life, and which can be manufactured with fewer grinding operations and thus at lower cost.

2. Related Background art

In the prior art, for production of a long life bearing, a case hardened steel containing about 0.2% of carbon such as SCr 420H, SAE 4320H, SCM 420H, etc. has been used. Through carburization a hardness at the surface portion as $H_RC$ of 58 to 64 and a hardeness at the core portion as $H_RC$ of 30 to 48 has been obtained.

Generally speaking, a carburized steel bearing has been known to be greater in rolling fatigue life as compared with a noncarburized hardened steel bearing. The reason for this is that when hardening is effected without carburization, the surface portion is cooled and is converted to martensite earlier than the core portion. As a result, strain due to expansion accompanying martensite formation remains in the circumferential direction as a tensile stress in the surface portion and as a compression stress in the core portion. For this reason, generation of so-called quench cracking or surface cracking as observed upon rolling fatigue breaking is promoted. On the other hand, when carburizing is effected, since diffusion of carbon into the austenite structure proceeds from the surface, the solid solution (dissolved) carbon content in the structure becomes more enriched in the surface portion than in the core portion, whereby the Ms point at the surface portion becomes lower as compared with the core portion. As a result, martensitic transformation occurs first at the core portion during hardening, so that there is residual circumferential compression stress in at the surface portion and tensile stress at the core portion. Thus, the generation of quench cracking and surface cracking can be prevented.

However, since the residual stress by carburization is at an equilibrium state between the surface portion and the core portion after hardening, when the surface layer is removed by grinding, the equilibrium is collapsed, thus giving rise to deformation and a problem of out-of-roundness. In order to correct out-of-roundness, the number of grinding operations must be is increased, but this leads to the disadvantage of increased production cost as compared with the noncarburization hardened steel bearing.

SUMMARY OF THE INVENTION

The present inventors, in view of the fact that the above problem is caused by the difference in residual stress between the surface portion and the core portion, have endeavored to improve further the rolling fatigue life which is the advantage of the carburized steel bearing of the prior art, and to reduce the number of required grinding operations by reducing the residual stress difference between the surface portion and the core portion, thereby to effect reduction in production cost.

The rolling bearing of the present invention has an inner race, an outer race and a rolling member, at least one of said inner race, outer race and rolling member being with an alloy steel consisting of two or more of 0.2 to 1.7% by weight of Mn, 0.2 to 1.2% by weight of Si, 0.2 to 1.7% by weight of Cr, 0.1 to 0.3% by weight of Mo and 0.1 to 1.0% by weight of Ni, and 0.4 to 0.7% by weight of C, with the balance of Fe, and by subjecting the alloy steel to carburizing hardening to yield:

(a) an additional carbon content at the surface portion of 0.35 to 0.6% by weight; and (b) a dissolved carbon content at the surface portion of 0.75 to 1.1% by weight, and having:

(c) a hardness at the core portion as $H_RC$ of 57 to 64; and (d) a difference in hardness between the surface portion as $H_RC$ and the core portion within ±5.

Alternatively, the rolling bearing of the present invention has an inner race, an outer race and a rolling member, at least one of said inner race, outer race and rolling member being made with an alloy steel consisting of two or more of 0.2 to 1.7% by weight of Mn, 0.2 to 1.2% by weight of Si, 0.2 to 1.7% by weight of Cr, 0.1 to 0.3% by weight of Mo and 0.1 to 1.0% by weight of Ni, and 0.4 to 0.7% by weight of C, with the balance of Fe, and by subjecting the alloy steel to carbonitriding hardening to yield:

(a) an additional carbonitrided amount at the surface portion of 0.35 to 0.6% by weight; and (b) a total of the dissolved carbon content and the dissolved nitrogen content at the surface portion of 0.75 to 1.1% by weight, and having:

(c) a hardness at the core portion as $H_RC$ of 57 to 64; and (d) a difference in hardness between the surface portion as $H_RC$ and the core portion within ±5.

DETAILED DESCRIPTION OF THE INVENTION

Figure 1:
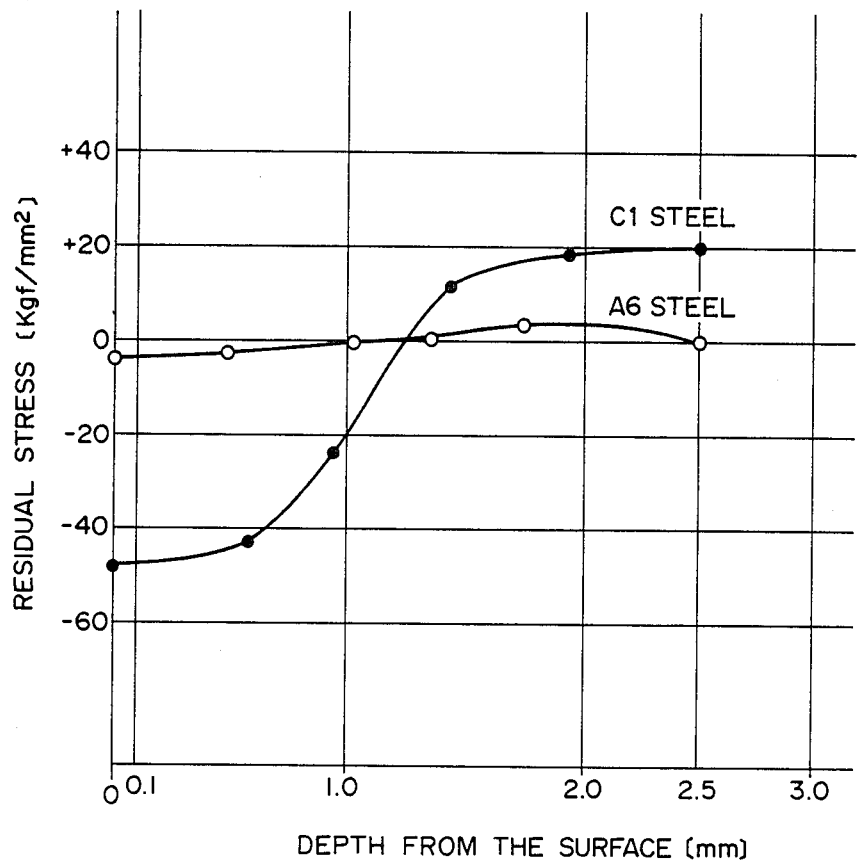
FIG. 1 illustrates typical examples of the distribution, in the thickness direction, of the residual stress in the circumferential direction in the outer races of a conventional carburized steel rolling bearing (ball bearing 6206) and a rolling bearing of the present invention (the same).

The present inventors have found that the residual stress difference between the surface portion and the core portion is related to the difference in hardness between the surface portion and the core portion. FIG. 1 illustrates the distribution, in the thickness direction, of the residual circumferential stress for the outer race of a carburized steel bearing of the prior art (C1 Steel) and the outer race of a carburized steel bearing according to the invention (A6 steel). As will be apparent, the prior art bearing race exhibits a great difference in hardness between the surface portion and the core portion, as compared with the bearing race of the present invention. Furthermore, as contrasted to the carburized steel race of the prior art, in the bearing race of the present invention, no great residual stress exists either at the surface portion or at the core portion. Here, the C1 steel corresponds to SCM 420 or SCM 421, which is lower in the base C%. Therefore, the core portion hardness cannot be increased and there is a great difference in hardness (hereinafter also called $\Delta H_R C$) between the surface portion and the core portion. In the carburized bearing of the present invention, a composition with higher base C% is used, and therefore the difference in hardness between the surface portion and the core portion is small. The compositions of C1 steel and A6 steel and hardness after carburizing hardening are shown in Table 1.

TABLE 1

Material steel composition and hardness after carburizing hardening of ball bearing outer race provided for measurement of residual stress distribution

| Steel species | Wt. % | | | | | Hardness after carburizing hardening (*1) | | |
|---|---|---|---|---|---|---|---|---|
| | C | Mn | Si | Cr | Mo | Surface portion | Core portion | Difference $\Delta H_R C$ |
| C1 | 0.21 | 0.75 | 0.25 | 0.99 | 0.21 | $H_R C$ 62.0 | $H_R C$ 47.1 | 14.9 |
| A6 | 0.69 | 1.35 | 0.22 | 1.05 | — | $H_R C$ 60.8 | $H_R C$ 60.1 | 0.7 |

(*1) Carburizing hardening was effected by heating to 930° C. for 8 hours, followed by oil cooling.

Figure 2:
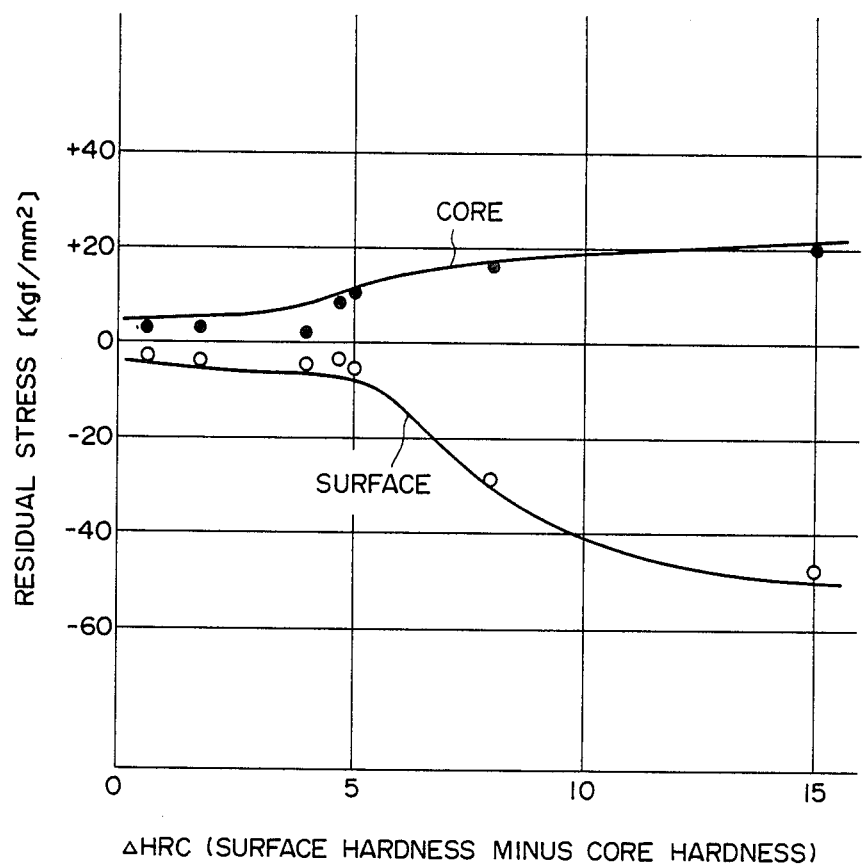
FIG. 2 illustrates the relationship between the residual stress difference and the difference in hardness in the outer races of the ball bearings 6206.

FIG. 2 shows the relationship between the residual stress difference and the difference in hardness. For minimizing deformation upon grinding, it is necessary to make both the residual stress value itself and the residual stress difference between the surface portion and the core portion in the relationship shown in FIG. 1, and for that purpose it would be understood that the difference in hardness $\Delta H_R C$ which is the parameter in the abscissa of FIG. 2 should be preferably made 5 or less.

In the present invention, by use of an alloy steel with a carbon content (base carbon) of 0.4 to 0.7% by weight, and by effecting carburizing hardening or carbonitriding hardening of the steel so that (a) the carburized amount or carbonitriding amount may be 0.35 to 0.6% by weight and (b) the dissolved carbon content or the total of the dissolved carbon amount and the dissolved nitrogen amount at the surface portion may be 0.75 to 1.1% by weight, (c) a hardness $H_R C$ at the core portion of 57 to 64 and (d) a hardness difference $\Delta H_R C$ within ±5 between the surface portion and the core portion can be realized.

On the other hand, it has been known in the art that with heat treatment carbon is diffused among iron atoms to have the function of strengthening through solid solution formation. In this case, the carbon forming solid solution in austenite is diffused in the material surface portion, and the carbon comes from carbon originally contained in the material (base carbon) and the additional carbon penetrated from the surface by carburization. By using additional carbon, the diffusion length becomes shorter as compared with the case in which diffusion is effected only with base carbon, whereby uniformly diffused solid solution formation can be effected. In other words, if the carburized carbon content is less than 0.35% by weight, diffusion is insufficient to effect solid solution strengthening, while if it is larger than 0.6% by weight, the residual austenite is increased in amount to lower the strength of the surface. When the carburized carbon content is 0.35 to 0.6% by weight, C atoms can be uniformly diffused into Fe atoms to effect solid solution strengthening with little stress concentration (martensitic transformation with little stress concentration), whereby $L_{10}$ becomes longer.

Also $L_{10}$ is dependent on, the so-called dissolved carbon content (carbon in solid solution) at the surface portion. More specifically, if the dissolved carbon content at the surface portion is less than 0.75% by weight, the strength of the surface layer is deficient. If this content is larger than 1.1% by weight, the residual austenite amount at the surface portion is increased after the heat treatment which reduces the strength of the surface layer. This results in a lower $L_{10}$ as compared with the carburized rolling bearing of the prior art, and also unnecessary elongation of carburizing time.

In the present invention, by use of the above alloy steel, and by effecting carburization or carbonitriding of the surface portion to the extent of 0.35 to 0.6% by weight, solid solution of C (or N) throughout austenite can be formed more uniformly as compared with the method in which an alloy steel containing carbon is hardened without carburizing. Accordingly, solid solution strengthening of the surface layer can be effected more uniformly, thus minimizing stress concentration source and imparting resistance to rolling fatigue. Furthermore, by controlling the dissolved carbon content or the total of the dissolved carbon content and the dissolved nitrogen content at the surface portion to 0.75 to 1.1% by weight, a rolling bearing with high surface hardness can be obtained while ensuring the function of alleviating accumulation of strain through high toughness of residual austenite of adequate amount.

Further, of the components in the above alloy steel, Mn, Si, Ni, Mo and Cr all contribute to improvement of hardenability. More particularly, Mn can readily form residual austenite, Si enhances the strength of the structure of the base, Cr imparts abrasion resistance, Mo toughness and Ni impact resistance.

The respective numerical limitations in claims 1 and 7 have the following critical significance.

The carbon content in the above alloy steel has the significance as the base carbon, and is also defined to give a core potion hardness to make $\Delta H_R C \leq 5$. If this is smaller than 0.4% by weight, $\Delta H_R C \leq 5$ cannot be achieved, and the carburization time for obtaining a desired hardness is prolonged. Also, the diffusion length of the carbon dissolved in austenite becomes longer, resulting in non-uniform solid solution of carbon in austenite and attendant stress concentration sources, whereby rolling fatigue resistance $L_{10}$ is also lowered.

On the other hand, if the bas carbon content is larger than 0.7% by weight, the dissolved carbon content in austenite becomes excessive, resulting in increased residual austenite and lower surface hardness after hardening. The range of 0.4 to 0.7% by weight ensures that the hardness of the core portion can approach the hardness of the surface portion, and at the same time it is also the range in which the rolling fatigue life $L_{10}$ can become longer and the carburization time shorter. The optimum value is from 0.45 to 0.70% by weight.

Manganese is contained in an amount of 0.2% by weight or more and serves as a hardenability improving component and a deacidifying agent during dissolving refining. However, if it is greater than 1.7% by weight, residual austenite will be increased to lower grindability and hot workability of the steel material.

Silicon also contributes to hardenability improvement and deacidification at a level of 0.2% by weight or more. However, if Si content is greater than 1.2% by weight, decarburization occurs on the surface during heat treatment, and also ferrite is increased at the core portion to lower press moldability, cold forgibility and mechanical properties. If Si content is within the range of 0.2 to 1.2% by weight, crushing value is also improved, and it contributes to improvement of rolling fatigue life $L_{10}$.

Chromium serves as a component for improving hardenability, carburizability, abrasion resistance and mechanical properties at a level of 0.2% by weight or more. However, if Cr content is greater than 1.7% by weight, excessive carburizing occurs to increase residual austenite and also particulate carbide is increased to make the carburized hardened layer brittle.

Molybdenum promotes hardenability and imparts toughness at a level of 0.1% by weight or more. However, if Mo content is greater than 0.3% by weight, excessive carburizing occurs to increase residual austenite in the carburized layer. For improvement of hardenability, C, Si, Mn or Cr can be used more economically instead thereof.

Nickel exhibits the action of improving hardenability at a level of 0.1% by weight or more, and otherwise improves impact resistance by promoting uniformity of the hardened structure. However, it is not economical to make Ni content 1.0% by weight or more for improvement of hardenability, and it is more economical to use C, Si, Mn or Cr instead thereof.

In the present invention, to provide a rolling fatigue life L10 at a level equal to the carburized steel of the prior art, the alloy steel should contain effectively 2 or more of manganese, silicon, chromium, molybdenum and nickel.

In practical environments such as the transmission of cars or trucks, rotatary portion of gasoline engines, power transmitting portions of industrial machines, etc., bearing life is often shortened by press marks formed on the track face by foreign materials such as dust, iron powder entrained in lubricating oil, biting into the track face.

Figure 8:
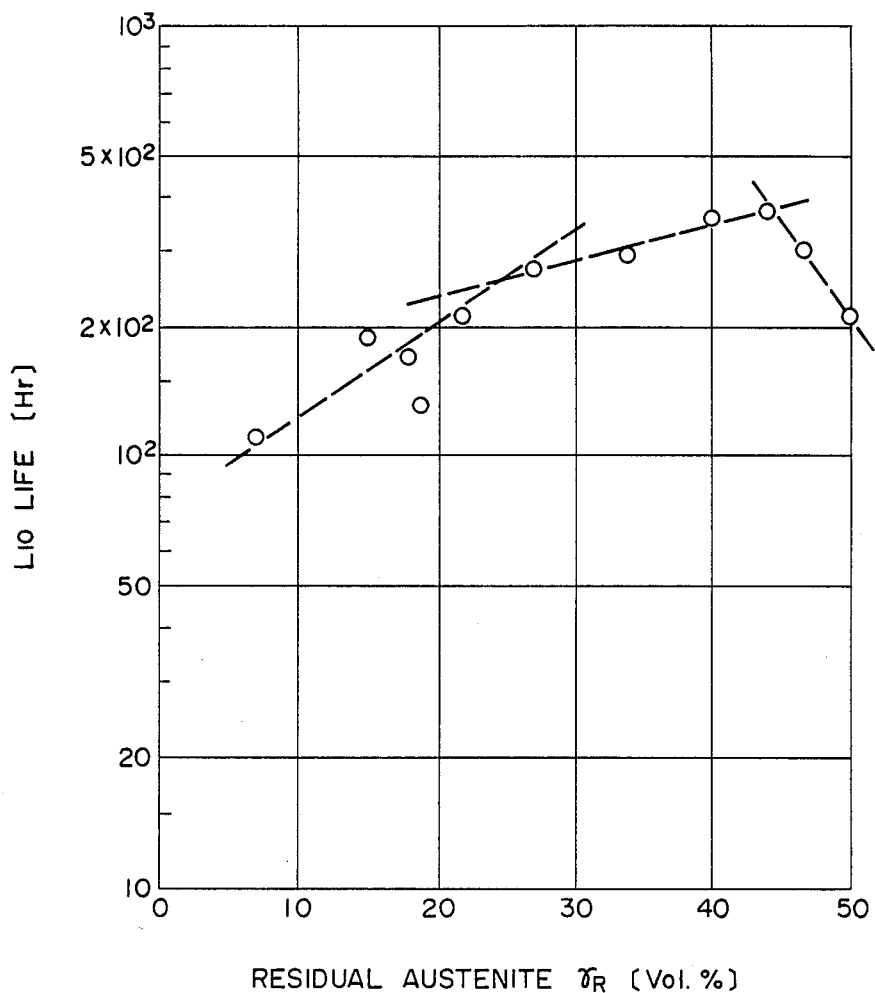
FIG. 8 illustrates the relationship between residual austenite content at the surface portion and $L_{10}$ value.

The present inventors continued to make investigations in order to obtain long rolling fatigue life even under entrainment of foreign materials as mentioned above, and consequently found that the amount of residual austenite is important in this respect. FIG. 8 shows the results of experiments demonstrating the relationship between the residual austenite amount and the life under lubrication in the presence of entrained impurities. FIG. 8 demonstrates that the life is extremely long in the range of residual austenite of 25 to 45 vol.%. This may be understood as follows.

The surface crack generated at the edge of the press mark formed by foreign material is frequently spread to lead finally to fatigue breaking. If the residual austenite amount is larger than 25 vol.%, even when a press mark may be formed, the edge of the press mark can be rounded when the roller rolls thereover, whereby stress concentration can be alleviated to inhibit generation of edge load. On the other hand, because austenite is not inherently strong, if the residual austenite amount exceeds 45 vol.%, there is an adverse effect on $L_{10}$.

Figure 7:
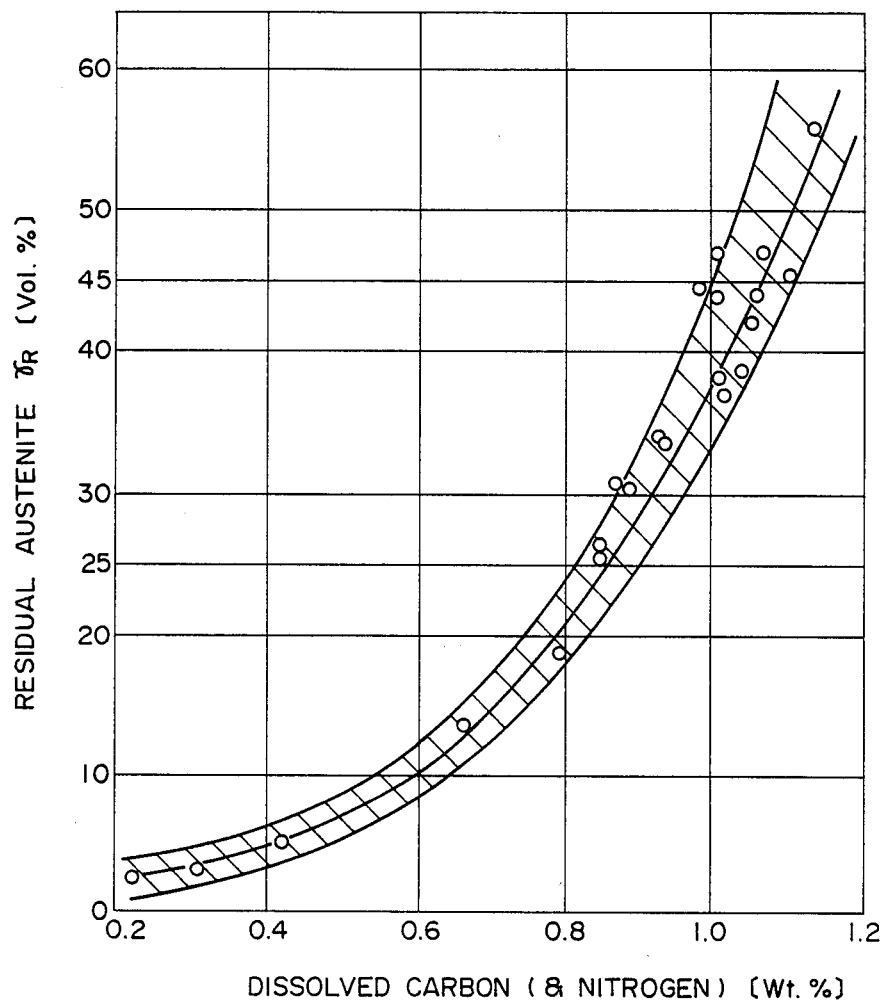
FIG. 7 illustrates the relationship between the residual austenite content and dissolved carbon content or the sum of dissolved carbon content and dissolved nitrogen content in the matrix.

The residual austenite amount is closely related to the dissolved carbon content (or dissolved carbon and nitrogen content). The relationship is shown in FIG. 7. As can be seen from FIG. 7, the dissolved carbon content or the total of the dissolved carbon content and the dissolved nitrogen content (hereinafter referred to generically as "solid-solution-equivalent carbon content") for making the residual austenite amount 25 to 45 vol.% optimum for $L_{10}$ is 0.85 to 1.1% by weight.

Also, the aforementioned additional ingredients (Mn, Si, Cr, Mo, and Ni) and their amounts contained in the alloy steel to be used in the present invention have influence on the residual austenite amount. The relationship between the residual austenite amount ($\gamma R$) and Ms point is shown by the equation (1) proposed by D. P. Koistinen:

$$\tau_R = e^{a(Ms-Tq)} \text{ (vol \%)} \quad (1)$$

$$a = -1.1 \times 10^{-2}$$

$Tq$ = quenching oil temperature (°C.)

Also, the influences of the elements added in the alloy steel on the Ms point may be represented by, for example, the following equation (2):

$$Ms \text{ (°C.)} = 538 - 317x(\% \text{ C}) - 33x(\% \text{ Mn}) - \quad (2)$$

$$28x(\% \text{ Cr}) - 17x(\% \text{ Ni}) - 11x(\% \text{ Si} + \% \text{ Mo} + \% \text{ W})$$

%: percent by weight

From the equations (1) and (2), suitable additive element groups and their amounts are 1.2 to 1.7% by weight of Mn and 0.2 to 0.6% by weight of Cr in the Mn-Cr system, 1.0 to 1.5% by weight of Mn, 0.3 to 0.6% by weight of Cr and 0.5 to 1.0% by weight of Ni in the Mn-Cr-Ni system, 0.5 to 1.0% by weight of Mn, 0.3 to 0.6% by weight of Cr and 0.8 to 1.2% by weight of Si in the Mn-Cr-Si system, and 1.2 to 1.7% by weight of Mn and 0.8 to 1.2% by weight of Si in the Mn-Si system.

With the additive elements incorporated in the above ranges, and with the earlier mentioned solid-solution-equivalent carbon content conditions, $\gamma_R$ amount around approximately the center value of the residual austenite range ($\gamma R$) of 25 to 45 vol% is obtained, and a suitable rolling bearing with long life particularly in the presence of intrained impurities can be provided.

As described above, the present invention provides a rolling bearing having a beneficial amount of residual austenite at the surface portion by the use of an alloy steel having a composition as described above and by effecting carburizing hardening to an additional carbon content of 0.35 to 0.6% by weight at the surface portion and a dissolved carbon content of 0.75 to 1.1% by weight at the surface portion. The invention alleviates accumulation of strain through the high toughness of said residual austenite and also ensures a surface hardness desirable for rolling fatigue life which is uniformly strengthened by solid solution. Additionally, since the hardness $H_RC$ of the core portion is made 57 to 64 and the difference in hardness between the surface portion and the core portion is made within $\Delta H_RC \pm 5$, the residual stresses at the surface portion and the core portion and the difference therebetween can be made smaller. Also, even if a part of the above additional carbon content may be replaced with the same weight of nitrogen content, a surface portion having the function of alleviating accumulation of strain as described above can be provided, and the residual stress values themselves at the surface portion and the core portion as well as the difference therebetween can be made smaller.

Employing roundness of the outer race outerdiameter as the paramemeter for evaluation of deformation, Table 2 shows comparative test results for various steel species and heat treatment conditions for ball bearing 6206. Table 2 shows the values after the heat treatment and further the values after completion of the outer race after subjecting the outer race outerdiameter to grinding in the order of flat plane—outerdiameter—outer race groove.

The respective materials and heat treatments in Table 2 were used as described below.

In Comparative examples 1-2, standard carburizing hardening was effected on SCr 420H as the material. In Comparative examples 3-5 bearing steel SUJ-2 was used as the material. Carburizing hardening was applied in Comparative example 3, carbonitriding (marstressing) in Comparative example 4 and standard hardening of the prior art in Comparative example 5. In Comparative examples 6-12, alloy steels employed in the present invention were used, and carburizing hardening was effected. In Examples 1 to 6, some alloy steels were used and carburizing hardening satisfying all of the conditions of the present invention, namely the additional carbon amount of the present invention, the dissolved carbon amount at the surface portion, the hardness of the core portion and $\Delta H_RC$, was conducted. In Examples 7-8 and corresponding Comparative example 13 alloy steels of the present invention were used, and the carburizing treatment was replaced with carbonitriding treatment, and a part of the additional carbon amount and the dissolved carbon amount was partially replaced with nitrogen. Table 3 shows the treatment conditions indicated by the numerals in Table 2, and Table 4 shows the values of the compositions of the steel species EX3, EX4, EX5 and EX6 indicated in Table 2.

TABLE 2

Relationship between heat treatment conditions of ball bearing 6206 and durable life and roundness

| | Steel species | Base carbon A C % | Basic treatment conditions (*5) | Dissolved carbon at surface B C % | Dissolved nitrogen at surface C N % | Dissolved C, N at surface B + C C + N % | Additional carbon C % | Additional C, N C + N % |
|---|---|---|---|---|---|---|---|---|
| Comparative Example | | | | | | | | |
| 1 | SCr420H | 0.21 | 1 | 0.95 | / | 0.95 | 0.74 | 0.74 |
| 2 | SCr420H | 0.21 | 1 | 0.72 | / | 0.72 | 0.51 | 0.51 |
| 3 | SUJ2 | 0.98 | 2 | 0.80 | / | 0.80 | 0.37 | 0.37 |
| 4 | SUJ2 | 0.98 | 3 | 0.85 | 0.18 | 1.03 | 0.37 | 0.55 |
| 5 | SUJ2 | 0.98 | 4 | 0.55 | / | 0.55 | 0 | 0 |
| 6 | EX3 | 0.45 | 5 | 0.79 | / | 0.79 | 0.34 | 0.34 |
| 7 | EX3 | 0.45 | 5 | 1.20 | / | 1.20 | 0.75 | 0.75 |
| 8 | EX4 | 0.50 | 5 | 0.72 | / | 0.72 | 0.22 | 0.22 |
| 9 | EX5 | 0.60 | 6 | 0.87 | / | 0.87 | 0.27 | 0.27 |
| 10 | EX5 | 0.60 | 6 | 1.31 | / | 1.31 | 0.11 | 0.71 |
| 11 | EX6 | 0.69 | 6 | 0.93 | / | 0.94 | 0.25 | 0.25 |
| 12 | EX6 | 0.69 | 6 | 1.16 | / | 1.16 | 0.47 | 0.47 |
| 13 | EX6 | 0.69 | 3 | 1.00 | 0.28 | 1.28 | 0.31 | 0.59 |
| Working Example | | | | | | | | |
| 1 | EX3 | 0.45 | 5 | 1.02 | / | 1.02 | 0.57 | 0.57 |
| 2 | EX4 | 0.50 | 5 | 0.94 | / | 0.94 | 0.44 | 0.44 |
| 3 | EX4 | 0.50 | 5 | 1.03 | / | 1.03 | 0.53 | 0.53 |
| 4 | EX4 | 0.50 | 5 | 1.10 | / | 1.10 | 0.60 | 0.60 |
| 5 | EX5 | 0.60 | 6 | 0.97 | / | 0.97 | 0.37 | 0.37 |
| 6 | EX5 | 0.60 | 6 | 1.10 | / | 1.10 | 0.50 | 0.50 |
| 7 | EX3 | 0.45 | 7 | 0.75 | 0.20 | 0.95 | 0.30 | 0.50 |
| 8 | EX5 | 0.60 | 7 | 0.81 | 0.21 | 1.02 | 0.21 | 0.42 |

| | Surface hardness (*1) D $H_RC$ | Inner hardness (*1) E $H_RC$ | Hardness difference D − E $\Delta H_RC$ | Durable life (*2) $L_{10}$ hr | Number of tests n (pcs.) | Roundness (outer race outerdiameter) (*3) | | | |
|---|---|---|---|---|---|---|---|---|---|
| | | | | | | After heat treatment $\overline{X}$ mm | $\sigma_{n-1}$ mm | After grinding (*4) $\overline{X}$ μm | $\sigma_{n-1}$ μm |
| Comparative Example | | | | | | | | | |
| 1 | 61.0 | 46.5 | 14.5 | 200 | 85 | 0.14 | 0.07 | 5.2 | 2.6 |
| 2 | 62.5 | 47.1 | 15.4 | 190 | 80 | 0.16 | 0.08 | 6.0 | 3.0 |
| 3 | 63.1 | 62.0 | 1.1 | 130 | 75 | 0.15 | 0.08 | 5.0 | 2.0 |
| 4 | 62.2 | 61.7 | 0.5 | 180 | 60 | 0.18 | 0.07 | 6.5 | 3.5 |
| 5 | 62.7 | 62.6 | 0.1 | 110 | 100 | 0.15 | 0.06 | 5.0 | 2.0 |
| 6 | 62.6 | 57.5 | 5.1 | 170 | 70 | 0.18 | 0.09 | 2.5 | 1.0 |
| 7 | 57.6 | 57.2 | 0.4 | 150 | 80 | 0.15 | 0.08 | 1.5 | 1.0 |

TABLE 2-continued

Relationship between heat treatment conditions of ball bearing 6206 and durable life and roundness

| | | | | | | | | | |
|---|---|---|---|---|---|---|---|---|---|
| 8 | 62.9 | 57.8 | 5.1 | 130 | 86 | 0.16 | 0.08 | 2.1 | 1.2 |
| 9 | 62.0 | 60.3 | 1.7 | 210 | 90 | 0.20 | 0.09 | 2.0 | 1.2 |
| 10 | 56.9 | 60.1 | −3.2 | 130 | 85 | 0.20 | 0.08 | 2.0 | 1.2 |
| 11 | 61.4 | 61.8 | −0.4 | 170 | 100 | 0.15 | 0.09 | 1.7 | 1.1 |
| 12 | 58.5 | 62.5 | −4.0 | 190 | 100 | 0.16 | 0.08 | 2.0 | 1.0 |
| 13 | 60.6 | 61.6 | −1.0 | 210 | 50 | 0.22 | 0.08 | 2.2 | 1.3 |
| Working Example | | | | | | | | | |
| 1 | 60.8 | 57.1 | 3.7 | 300 | 75 | 0.15 | 0.07 | 2.0 | 1.1 |
| 2 | 61.9 | 58.0 | 3.9 | 270 | 89 | 0.25 | 0.07 | 2.0 | 1.2 |
| 3 | 61.5 | 58.5 | 2.0 | 300 | 75 | 0.25 | 0.08 | 2.0 | 1.1 |
| 4 | 59.1 | 59.1 | 0 | 270 | 80 | 0.15 | 0.10 | 2.1 | 1.1 |
| 5 | 61.0 | 59.7 | 1.3 | 290 | 95 | 0.20 | 0.08 | 2.1 | 1.2 |
| 6 | 59.2 | 60.1 | −0.9 | 320 | 90 | 0.18 | 0.07 | 1.9 | 1.3 |
| 7 | 60.5 | 58.0 | 2.5 | 350 | 50 | 0.20 | 0.07 | 2.5 | 1.0 |
| 8 | 61.0 | 59.7 | 1.3 | 370 | 50 | 0.18 | 0.07 | 1.9 | 1.1 |

Figure 6:
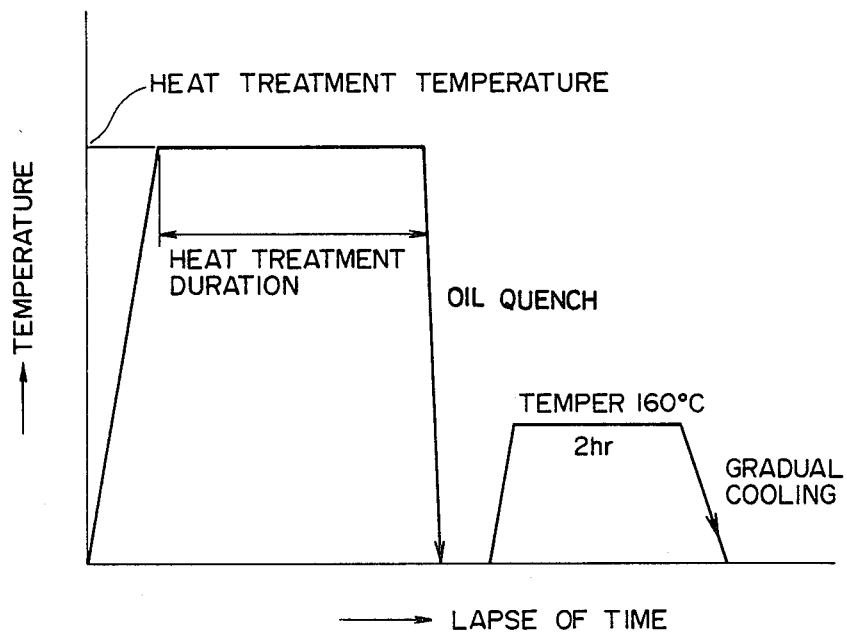
FIG. 6 illustrates schematically the heat treatment steps.

(*1) Surface hardness was measured at the depth of 0.1 mm from the surface and inner hardness at the depth of 2.5 mm from the surface.
(*2) Durable life $L_{10}$ is represented by inner race peel-off life (because inner race is peeled off first).
(*3) Roundness is represented by outer race outerdiameter (because outer race outerdiameter is the largest).
(*4) Grinding order is in the order of flat plane → outerdiameter → outer race groove.
(*5) The basic heat treatment condition are as shown in FIG. 6. 1 - 7 represent that the heat treatment temperature, the heat treatment time and the atmosphere during heat treatment are set at the conditions shown in Table 3. The carburizing (nitriding) amount and the dissolved carbon (nitrogen) content at surface were varied by controlling the enriched gas.

TABLE 3

| | Heat treatment conditions | | |
|---|---|---|---|
| Condition No. | Heat treatment temperature (°C.) | Heat treatment time (hr) | Atmosphere |
| 1 | 930 | 8 | R × Gas + Enriched gas |
| 2 | 870 | 1 | R × Gas + Enriched gas |
| 3 | 850 | 4 | R × Gas + Enriched gas + Ammonia gas (5%) |
| 4 | 830 | 0.6 | Only R × Gas |
| 5 | 890 | 4 | R × Gas + Enriched gas |
| 6 | 870 | 2 | R × Gas + Enriched gas |
| 7 | 850 | 3 | R × Gas + Enriched gas + Ammonia gas (5%) |

TABLE 4

| | Component values of steel | | | | | |
|---|---|---|---|---|---|---|
| | C | Mn | Si | Cr | Mo | Ni |
| Ex 3 | 0.45 | 1.34 | / | 0.52 | / | 0.75 |
| Ex 4 | 0.50 | 1.52 | / | 0.40 | / | / |
| Ex 5 | 0.60 | 1.45 | / | 0.41 | / | / |
| Ex 6 | 0.69 | 0.82 | 1.0 | 0.51 | / | / |

(Wt. %)

Referring to the roundness values of outer race outerdiameter as shown in Table 2, the values after heat treatment of Comparative examples 1-5, Comparative examples 6-12 and Examples 1-6 are comparable, while the values of roundness of outer race outerdiameter after the above grinding working of Comparative examples 6-12 and Examples 1-6 are all about ½ of those of Comparative examples 1-5. This means that in a carburization hardened rolling bearing using an alloy steel according to the present invention and satisfying the condition of $\Delta H_R C < 5$, the residual stress values at the surface portion and the core portion and the difference therebetween is small, as compared with a bearing by use of standard caburizing hardening of the prior art or by use of the bearing steel subjected to carburizing hardening, carbonitriding and standard hardening treatment. In addition, no correction grinding is required for the outer race outerdiameter roundness level of Comparative examples 6-12 and Examples 1-6, thus evidencing that the rolling bearing of the present invention can be reduced in production cost as compared with the rolling bearing of the prior art, as represented by Comparative examples 1-5. Further, also in Examples 7-8 and Comparative example 13, the same results as in Comparative examples 6-12 and Examples 1-6 as described above are shown, wherefrom it can be also recognized that the object of the present invention can be accomplished even when a part of the additional carbon content at the surface portion is replaced with nitrogen.

Next, the ball bearings 6206 completed by use of rolling members according to the same material and the heat treatment conditions as in the above evaluation of outer race outerdiameter roundness were subjected to a rolling durability life test by use of a ball bearing life tester produced by Nippon Seiko K. K. to confirm that the bearing of the present invention has long life.

Bearing life test was conducted by means of the above ball bearing life tester using a lubricant containing steel powder (hardness Hv 300-500, particle size 80-160 μm) added at a mixing ratio of 100 ppm in a turbine oil (FBK oil R068, produced by Nippon Oil) under a bearing load (radial load) of 600 Kgf and at a bearing rotation speed of 2000 rpm. Such conditions were employed because in practice, a rolling bearing is frequently subject to forming of press marks by dust or other foreign material entrained in the lubricant, and evaluation of practical rolling fatigue life should be based on realistic conditions.

Comparative example 3 shows an example in which the heat treatment of the bearing steel SUJ2, conventionally noncarburizing hardened, was changed to carburizing hardening.

Comparative example 4 is an example of marstressing conventionally practiced in the prior art.

Comparative example 5 is an example of standard hardening of the bearing steel of the prior art.

In contrast, Comparative examples 6-12 and Examples 1-6 are examples in which carburizing hardening was effected under various conditions by use and procedures according to the steel of the present invention.

When the life test results of Comparative examples 1-5 are compared, the carburized bearings of conventional carburized steel (Comparative examples 1-2) have the longest life, and next the marstressing treated bearing of Comparative example 4.

SUJ2 bearings of Comparative examples 3 and 5 have short lives in both the cases of carburizing hardening and standard hardening.

Figure 3:
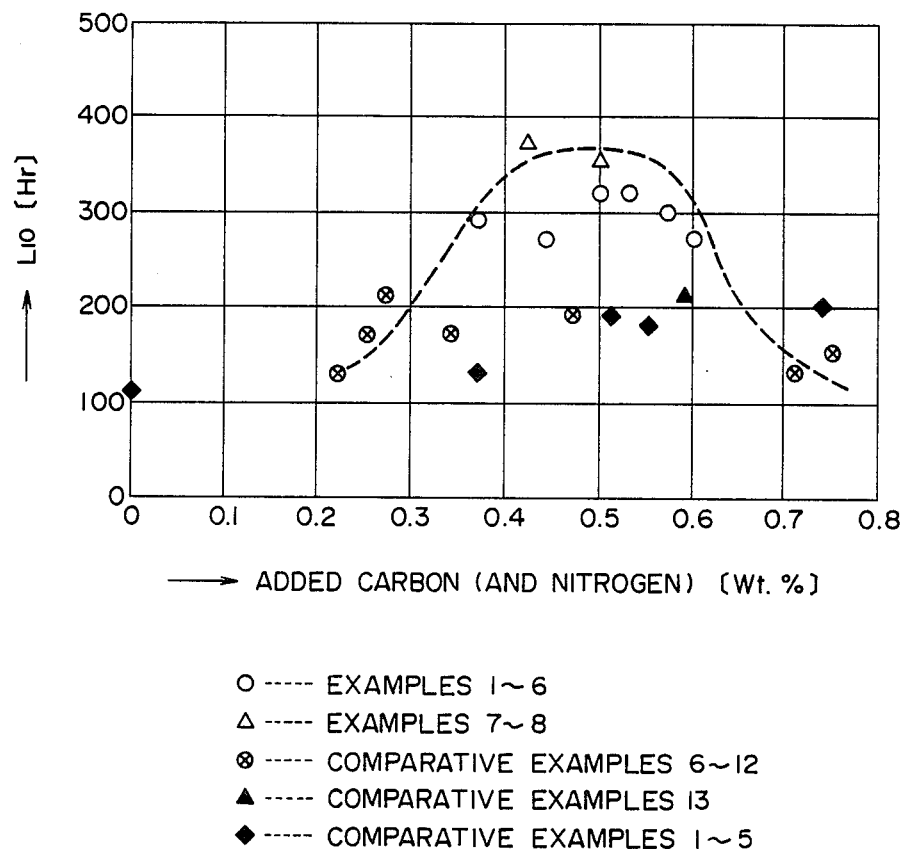
FIG. 3 illustrates the relationship between $L_{10}$ value and added carbon (or nitrogen) wt.%.
Figure 4:
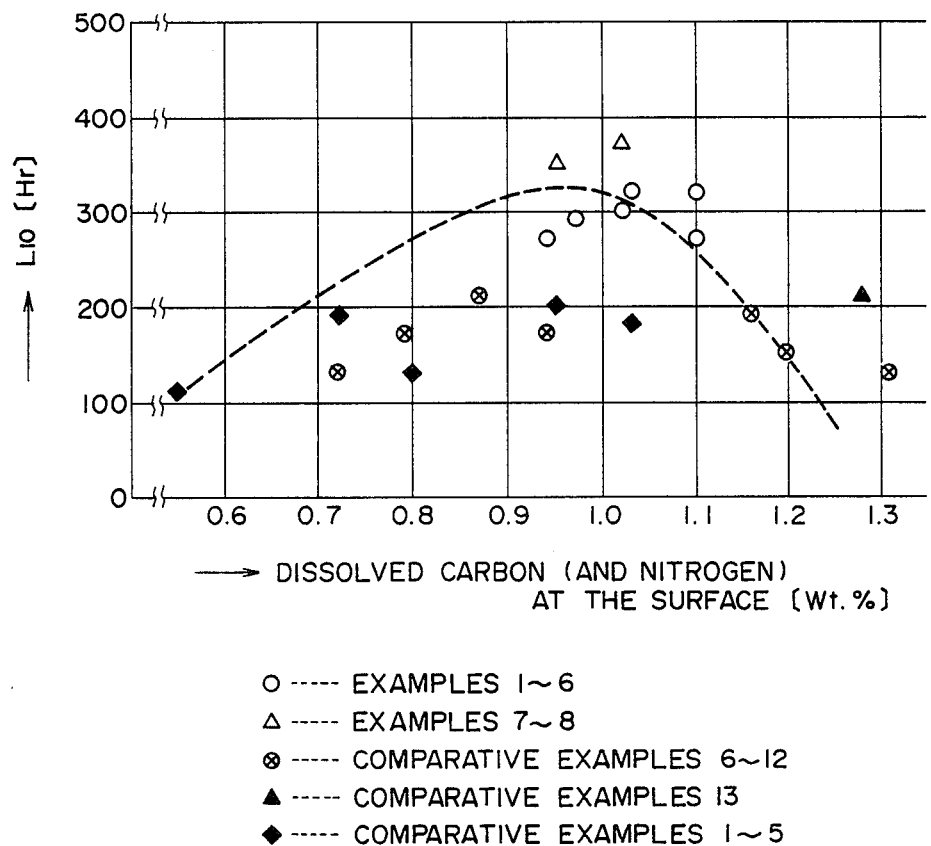
FIG. 4 illustrates the relationship between $L_{10}$ value and dissolved carbon (or nitrogen) wt.% at the surface.

Next, reference is made to FIG. 3–FIG. 4 showing the relationship between $L_{10}$ values and the dissolved carbon (or +nitrogen) wt.% and the additional carbon (or +nitrogen) wt.% in the solid solution formed in the surface portion base (matrix). These Figures are prepared based on the results in Table 2, and in all of the Figures, the data were plotted for comparison of the $L_{10}$ values for the Examples of the invention with the respective $L_{10}$ values of the rolling bearings (6206) subjected to carburizing hardening, carbonitriding (marstressing) and standard hardening treatment by use of the standard carburizing hardening and the bearing steel (SUJ-2).

Figure 5:
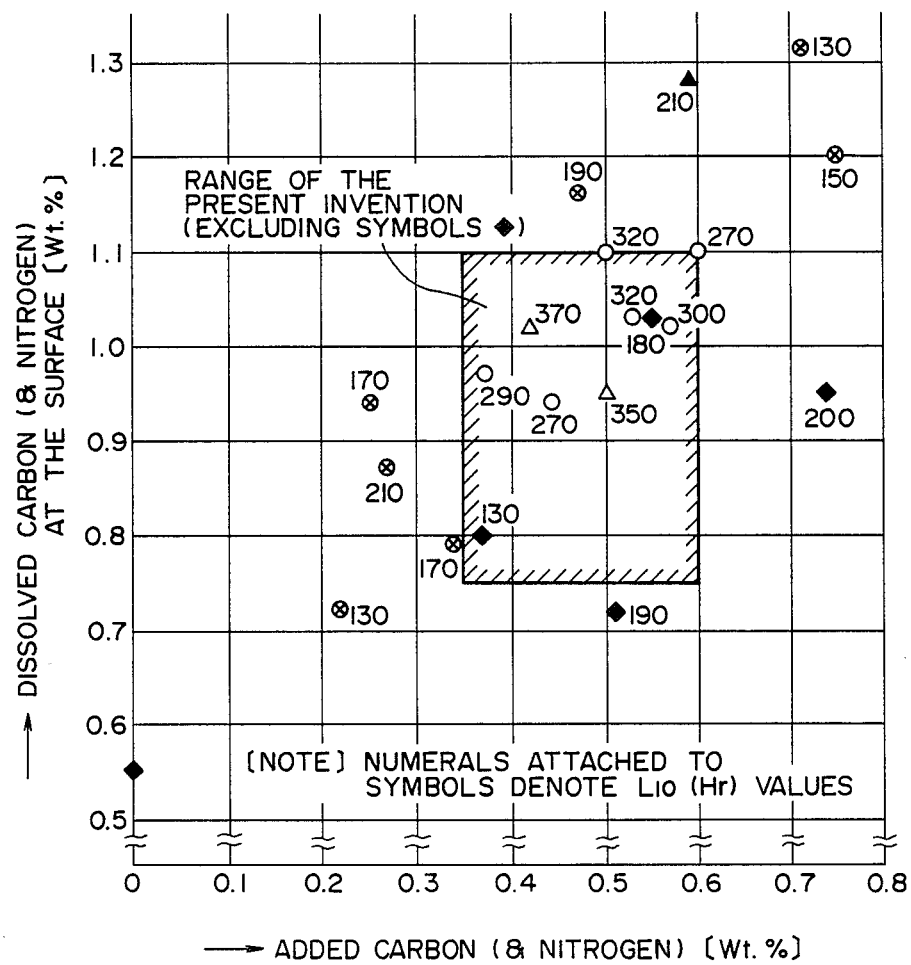
FIG. 5 illustrates the relationship among $L_{10}$ value and added carbon (or nitrogen) wt.% and dissolved carbon (or nitrogen) wt.% at the surface.

In FIG. 3, it will be seen that for surpassing the carburized steel bearing $L_{10}$ level of the prior art, the additional carbon (or +nitrogen) wt.% by heat treatment of alloy steel in accordance with the present invention must be in the range of 0.35 to 0.6%. Also, as shown in FIG. 4, the dissolved carbon (or +nitrogen) wt.% at the surface must be 0.75 to 1.1%. Further, from FIG. 5, there can be deduced the result that the rolling durability life L10 cannot be surpassed unless the above additional carbon (or +nitrogen) wt.% and the solid solution carbon (or +nitriding) satisfy both of the above ranges at the same time.

Further, according to FIG. 8, for extending the rolling fatigue life in the presence of lubricant with entrained foreign material, it can be understood to be extremely preferable to make the residual austenite amount 25 to 45 vol.%.

The rolling bearing of the present invention, as compared with the carburized steel bearing of the prior art, has remarkably small residual stress difference between the surface portion and the core portion of the inner race, outer race or roller made in accordance with the preceding teachings, and therefore has the specific advantage that deformation after grinding is small, that is, roundness after grinding is high. Owing to such advantage, correction grinding conventionally practiced for correction of out-of-roundness can be omitted or reduced, whereby reduction in production cost can be effected.

Further, the rolling bearing of the present invention, by having a specific amount of carburizing treatment applied to a steel alloy having a specific composition and may minimizing the above residual stress difference, exhibits little stress concentration at the surface portion and achieves a superior $L_{10}$ range (270.320 Hr), the maximum of which is about 3-fold the $L_{10}$ value (110 Hr) of the non-carburization hardened bearing steel of the prior art and 1.6-fold the $L_{10}$ (195 Hr on an average) of the carburized steel bearing of the prior art.

Also, the alloy steel employed in the present invention has higher base carbon content as compared with the carburized steel of the prior art and therefore the time required for carburization can be shortened to $\frac{1}{2}$ to $\frac{1}{4}$.

Also, the same effect can be exhibited even when a part of the additional carbon content carburized at the surface portion of the present invention is replaced with nitrogen by carbonitriding.

What is claimed is:

1. A rolling-type bearing having an inner race, an outer race and a rolling member, at least one of said inner race, outer race and rolling member being made with an alloy steel consisting essentially of Fe with 0.4 to 0.7% by weight of C and at least two elements selected from the group consisting of 0.2 to 1.7% by weight of Mn, 0.2 to 1.2% by weight of Si, 0.2 to 1.7% by weight of Cr, 0.1 to 0.3% by weight of Mo and 0.1 to 1.0% by weight of Ni, said alloy having been subjected to carburizing hardening to obtain
    (a) a carburized amount at the surface portion of 0.35 to 0.6% by weight and
    (b) a dissolved carbon content at the surface portion of 0.75 to 1.1% by weight, and having
    (c) a hardness at the core portion as $H_RC$ of 57 to 64 and
    (d) a difference in hardness between the surface portion and the core portion within ±5 as $H_RC$.

2. A rolling-type bearing according to claim 1, wherein said dissolved carbon content at the surface portion is from 0.85 to 1.1% by weight.

3. A rolling-type bearing according to claim 1 or claim 2, wherein said alloy steel consists essentially of Fe with 1.2 to 1.7% by weight of Mn, 0.2 to 0.6% by weight of Cr and 0.4 to 0.7% by weight of C.

4. A rolling-type bearing according to claim 1 or claim 2, wherein said alloy steel consists essentially of Fe with 1.0 to 1.5% by weight of Mn, 0.3 to 0.6% by weight of Cr, 0.5 to 1.0% by weight of Ni and 0.4 to 0.7% by weight of C.

5. A rolling-type bearing according to claim 1 or claim 2, wherein said alloy steel consists essentially of Fe with 0.5 to 1.0% by weight of Mn, 0.3 to 0.6% by weight of Cr, 0.8 to 1.2% by weight of Si and 0.4 to 0.7% by weight of C.

6. A rolling-type bearing according to claim 1 or claim 2, wherein said alloy steel consists essentially of Fe with 1.2 to 1.7% by weight of Mn, 0.8 to 1.2% by weight of Si and 0.4 to 0.7% by weight of C.

7. A rolling-type bearing having an inner race, an outer race and a rolling element, at least one of said inner race, outer race and rolling element being made with an alloy steel consisting essentially of Fe with 0.4 to 0.7% by weight of C and at least two elements selected from the group consisting of 0.2 to 1.7% by weight of Mn, 0.2 to 1.2% by weight of Si, 0.2 to 1.7% by weight of Cr, 0.1 to 0.3% by weight of Mo and 0.1 to 1.0% by weight of Ni, said alloy steel having been subjected to carbonitriding hardening to obtain
    (a) a carbonitrided amount at the surface portion of 0.35 to 0.6% by weight and
    (b) a total content of dissolved carbon and dissolved nitrogen at the surface portion of 0.75 to 1.1% by weight, and having
    (c) a hardness at the core portion as $H_RC$ of 57 to 64 and
    (d) a difference in hardness between the surface portion and the core portion within ±5 as $H_RC$.

8. A rolling-type bearing according to claim 7, wherein said total content of dissolved carbon and dissolved nitrogen at the surface portion is 0.85 to 1.1% by weight.

9. A rolling-type bearing according to claim 7 or claim 8, wherein said alloy steel consists essentially of Fe with 1.2 to 1.7% by weight of Mn, 0.2 to 0.6% by weight of Cr and 0.4 to 0.7% by weight of C.

10. A rolling-type bearing according to claim 7 or claim 8, wherein said alloy steel consists essentially of Fe with 1.0 to 1.5% by weight of Mn, 0.3 to 0.6% by weight of Cr, 0.5 to 1.0% by weight of Ni and 0.4 to 0.7% by weight of C.

11. A rolling-type bearing according to claim 7 or claim 8, wherein said alloy steel consists essentially of Fe with 0.5 to 1.0% by weight of Mn, 0.3 to 0.6% by weight of Cr, 0.8 to 1.2% by weight of Si and 0.4 to 0.7% by weight of C.

12. A rolling-type bearing according to claim 7 or claim 8, wherein said alloy steel consists essentially of Fe with 1.2 to 1.7% by weight of Mn, 0.8 to 1.2% by weight of Si and 0.4 to 0.7% by weight of C.

* * * * *